(12) United States Patent
Skinner et al.

(10) Patent No.: US 6,918,125 B1
(45) Date of Patent: Jul. 12, 2005

(54) METHOD OF INTEGRATING X WINDOW INTRINSICS BASED TOOLKITS AND WIDGETS WITH JAVA

(75) Inventors: John V Skinner, New Berlin, WI (US); David P. Edwards, Highland, UT (US)

(73) Assignee: GE Medical Systems Global Technology Company LLC, Waukesha, WI (US)

( * ) Notice: Subject to any disclaimer, the term of this patent is extended or adjusted under 35 U.S.C. 154(b) by 484 days.

(21) Appl. No.: 09/678,207

(22) Filed: Sep. 20, 2000

Related U.S. Application Data
(60) Provisional application No. 60/215,926, filed on Jul. 3, 2000.

(51) Int. Cl.[7] .................................................. G06F 9/54
(52) U.S. Cl. ...................... 719/329; 719/310; 719/328
(58) Field of Search ................................. 719/310, 328, 719/329; 709/310, 328, 329

(56) References Cited

U.S. PATENT DOCUMENTS

| | | | | |
|---|---|---|---|---|
| 5,475,845 A | * | 12/1995 | Orton et al. ................ | 709/328 |
| 5,630,136 A | * | 5/1997 | Davidson et al. ........... | 709/106 |
| 5,706,515 A | * | 1/1998 | Connelly et al. ............ | 709/106 |
| 6,115,719 A | | 9/2000 | Purdy et al. | |

OTHER PUBLICATIONS

Lee, Adding External Input Sources to the X Toolkit Event Loop, 1995.*
Kenton Lee X and Motif Consulting, *X Window System Technical Glossary*, http://www.rahul.net/kenton/xglossary.html, pp. 1–13 (Jun. 25, 2000).
*Glossary of Java and Related Terms*, http://java.sun.com/docs/glossary.print.html, pp. 1–35 (Jun. 26, 2000).
12. *Why can't XtAppAddInput( ) handle files?*, http://www.faqs.org/faqs/Xt–FAQ/section–13.html, p. 1 (Jun. 25, 2000).
13 *!What good books and magazines are there on Xt?*, http://www.faqs.org/faqs/Xt–FAQ/section–14.html, pp. 1–2 (Jun. 25, 2000).
26. *Why don't XtAddInput( ), HtAddTimeout( ) and HtAddWorkProc( ) work?*, http://www.faqs.org/faqs/Xt–FAQ/section–27.html, p. 1 (Jun. 25, 2000).

(Continued)

*Primary Examiner*—Meng-Al T. An
*Assistant Examiner*—Li Zhen
(74) *Attorney, Agent, or Firm*—Ziolkowski Patent Solutions Group, LLC; Michael A. Della Penna; Carl B. Horton

(57) ABSTRACT

A method of integrating an Xt Intrinsics based toolkit with a JAVA application. The application includes a process thread that implements an X event loop and an application thread that suspends execution of the event loop to allow a call to be made through the JAVA Native Interface to a toolkit or a widget to cause something to be displayed. The application thread includes a write socket to communicate a token to a read socket of the event loop, and performs a blocking read suspending the thread. The event loop returns an acknowledgment token via a write socket to a read socket of the thread that unblocks its blocking read and the event loop invokes its own blocking read suspending its execution. The file descriptor function, XtAppAddInput, preferably, is used to read the token and to set the blocking read. After a toolkit call is made, a token is sent from a second write socket of the thread to a second read socket of the event loop that unblocks its blocking read resuming the event loop. JAVA multithreading support services, such as JAVA's wait and notifyAll methods, are employed in multithreaded applications to ensure that only one thread at a time can make a call. Use of a separate Intrinsics application context to service the event loop is employed, windows are managed in separate hierarchies associated with each application context, and a special JAVA Canvas manages native windows transparent to the programmer.

35 Claims, 3 Drawing Sheets-

OTHER PUBLICATIONS

O'Reilly, N, *X Toolkit int.prog.OSF/MOTIF* vol. 4M, http://consult.cern.ch/book/1565920139, p. 1 (Apr. 12, 2000).
*Class Canvas,* http://java.sun.com/products/jdk/1.0.2/api/java.awt.Canvas.html, pp. 1–2 (Apr. 13, 2000).
*Package java.awt,* http://java.sun.com/products/jdk/1.0.2/api/Package–java.awt.html, pp. 1–2 (Apr. 13, 2000).
*X Window System,* http://foldoc.doc.ic.ac.uk/foldoc/foldoc.cgi?X+Window+System, p. 1 (Jun. 27, 2000).
*The Protocol,* http://www.x.org/about_x.htm, pp. 1–2 (Jun. 25, 2000).
*comp.windows.x.intrinsics Frequently Asked Questions (FAQ),* http://www.faqs.org/faqs/Xt–FAQ/preamble.html, pp. 1–3 (Jun. 25, 2000).
*Java API Documentation Version 1.0.2,* http://java.sun.com/products/jdk/1.0.2/api/packages.html, p. 1 (Apr. 13, 2000).
The Java™ Tutorial, *Lesson: Overview of the JNI,* http://web2.java.sun.com/docs/books/tutorial/native1.1/concepts/index.html, p. 3 (Jul. 11, 2000).
The Java™ Tutorial, *Lesson: Writing a Java Program with Native Methods,* http://web2.java.sun.com/docs/books/tutorial/native.1/stepbystep/index.html, pp. 1–3 (Jul. 11, 2000).
The Java™ Tutorial, *Step 1: Write the Java Code,* http://web2.java.sun.com/docs/books/tutorial/native1.1/stepbystep/step1.html, pp. 1–2 (Jul. 11, 2000).
The Java™ Tutorial, *Step 2: Compile the Java Code,* http://web2.java.sun.com/docs/books/tutorial/native1.1/stepbystep/step2.html, p. 1 (Jul. 11, 2000).
The Java™ Tutorial, *Step 3: Create the .h File,* http://web2.java.sun.com/docs/books/tutorial/native1.1/stepbystep/step3.html, pp. 1–2 (Jul. 11, 2000).
The Java™ Tutorial, *Step 4: Write the Native Method Implementation,* http://web2.java.sun.com/docs/books/tutorial/native1.1/stepbystep/step4.html, pp. 1–2 (Jul. 11, 2000.
The Java™ Tutorial, *Step 5: Create a Shared Library,* http://web2.java.sun.com/docs/books/tutorial/native1.1/stepbystep/step5.html, p. 1 (Jul. 11, 2000).
The Java™ Tutorial, *Step 6: Run the Program,* http://web2.java.sun.com/docs/books/tutorial/native1.1/stepbystep/step6.html, p. 1 (Jul. 11, 2000).
The Java™ Tutorial, *Lesson: Integrating Java and Native Programs,* http://web2.java.sun.com/docs/books/tutorial/native1.1/integrating/index.html, p. 1 (Jul. 11, 2000).
The Java™ Tutorial, *Declaring Native Methods,* http://web2.java.sun.com/docs/books/tutorial/native1.1/integrating/declare.html, pp. 1–3 (Jul. 11, 2000).
The Java™ Tutorial, *Mapping Between Java and Native Types,* http://web2.java.sun.com/docs/books/tutorial/native1.1/integrating/types.html, pp. 1–2 (Jul. 11, 2000).
The Java™ Tutorial, *Lesson: Interacting with Java from the Native Side,* http://web2.java.sun.com/docs/books/tutorial/native1.1/implementing/index.html, pp. 1–2 (Jul. 11, 2000).
The Java™ Tutorial, *Accessing Java Strings in Native Methods,* http://web2.java.sun.com/docs/books/tutorial/native1.1/implementing/string.html, pp. 1–2 (Jul. 11, 2000).
The Java™ Tutorial, *Working With Java Arrays in Native Methods,* http://web2.java.sun.com/docs/books/tutorial/native1.1/implementing/array.html, pp. 1–4 (Jul. 11, 2000).
The Java™ Tutorial, *Calling Java Methods,* http://web2.java.sun.com/docs/books/tutorial/native1.1/implementing/method.html, pp. 1–5 (Jul. 11, 2000).
The Java™ Tutorial, *Accessing Java Member Variables,* http://web2.java.sun.com/docs/books/tutorial/native1.1/implementing/field.html, pp. 1–2 (Jul. 11, 2000).
The Java™ Tutorial, *Handling Java Errors from Native Methods,* http://web2.java.sun.com/docs/books/tutorial/native1.1/implementing/error.html, pp. 1–2 (Jul. 11, 2000).
The Java™ Tutorial, *Local and Global Reference,* http://web2.java.sun.com/docs/books/tutorial/native1.1/implementing/refs.html, pp. 1–3 (Jul. 11, 2000).
The Java™ Tutorial, *JNI Programming in C++,* http://web2.java.sun.com/docs/books/tutorial/native1.1/implementing/cpp.html, pp. 1–2 (Jul. 11, 2000).
The Java™ Tutorial, *Lesson: Doing Two or More Tasks at Once: Threads,* http://web2.java.sun.com/docs/books/tutorial/essential/threads/index.html, pp. 1–2 (Jul. 11, 2000).
The Java™ Tutorial, *What is a Thread?,* http://web2.java.sun.com/docs/books/tutorial/essential/threads/definition.html, pp. 1–2 (Jul. 11, 2000).
The Java™ Tutorial, *Customizing a Thread's run Method,* http://web2.java.sun.com/docs/books/tutorial/essential/threads/customizing.html, p. 1 (Jul. 11, 2000).
The Java™ Tutorial, *Subclassing Thread and Overriding run,* http://web2.java.sun.com/docs/books/tutorial/essential/threads/simple.html, pp. 1–2 (Jul. 11, 2000).
The Java™ Tutorial, *Implementing the Runnable Interface,* http://web2.java.sun.com/docs/books/tutorial/essential/threads/clock.html, pp. 1–3 (Jul. 11, 2000).
The Java™ Tutorial, *The Life Cycle of a Thread,* http://web2.java.sun.com/docs/books/tutorial/essential/threads/lifecycle.html, pp. 1–5 (Jul. 11, 2000).
The Java™ Tutorial, *Understanding Thread Priority,* http://web2.java.sun.com/docs/books/tutorial/essential/threads/priority.html, pp. 1–5 (Jul. 11, 2000).
The Java™ Tutorial, *Synchronizing Threads,* http://web2.java.sun.com/docs/books/tutorial/essential/threads/clock.html, pp. 1–2 (Jul. 11, 2000).
The Java™ Tutorial, *Grouping Threads,* http://web2.java.sun.com/docs/books/tutorial/essential/threads/group.html, pp. 1–2 (Jul. 12, 2000).
The Java™ Tutorial, *The ThreadGroup Class,* http://web2.java.sun.com/docs/books/tutorial/essential/threads/threadgroup.html, pp. 1–5 (Jul. 12, 2000).
The Java™ Tutorial, *Summary,* http://web2.java.sun.com/docs/books/tutorial/essential/threads/summaryhtml, pp. 1–2 (Jul. 12, 2000).
X Windows/Motif Programming, http://www.cm.cd.ac.uk/Dave/X_lecture/X_book_caller/index.html, pp. 1–155 (Jul. 3, 2000).

* cited by examiner

METHOD OF INTEGRATING X WINDOW INTRINSICS BASED TOOLKITS AND WIDGETS WITH JAVA

CROSS-REFERENCE TO RELATED APPLICATION

This application claims the benefit of prior U.S. Provisional Application Ser. No. 60/215,926, filed Jul. 3, 2000 and entitled METHOD OF INTEGRATING X WINDOWS INTRINSICS BASED SOFTWARE AND JAVA.

BACKGROUND OF THE INVENTION

The present invention relates generally to using already developed software of one type with another type of software and more particularly to, a method of integrating preexisting X Windows Intrinsics based toolkits, widgets and the like with JAVA JAVA® is a registered trademark of, and a software development system originated by, Sun Microsystems, Inc., of 901 San Antonio Road, Palo Alto, Calif. 94303, that includes a programming language that is somewhat similar to C and includes extensive development tools along with unique technologies that permit software developers to develop software applications that can be run on many different kinds of computers and operating systems in an attempt to provide a platform-independent development system. Thus, with JAVA, a software developer does not have to include certain code that is specific for the type of computer on which the program will run. As a result, an application written using JAVA can run on different kinds of computers and with different kinds of operating systems. For example, JAVA has been designed so that the same application written in JAVA can be run, largely without any modification whatsoever, on computers that are as different as a PC, a Macintosh computer, a VMX computer, and a Unix computer.

JAVA is relatively young, having been introduced only recently in 1995. Although the number of applications written in JAVA is undoubtedly increasing every day due to its popularity, some other long established development systems have many tried-and-true building-block programs already at their disposal. In developing a JAVA application, it can be desirable to integrate or use at least some of this preexisting software with the application being developed to avoid reinventing the wheel. Using preexisting software advantageously saves time, because it does not need not be ported over to JAVA and debugged, saves money, because so much time is saved, and, in the end, can produce a more robust, feature-filled, and reliable JAVA application.

A visualization toolkit is an example of one type of software that can be integrated into JAVA for this purpose. A visualization toolkit typically includes a suite of simple, yet powerful, object components that are typically used in the development of programs that have two and three dimensional graphic and visualization capabilities as well as programs that handle certain types of input and output. For example, there are a number of visualization and graphics toolkits available for the X Window system, which is a graphics protocol and support system for building graphical user interfaces in Unix and Unix based systems. X Window visualization and graphics toolkits include MOTIF®, GIMP, and VTK, as well as other specialized third party toolkits.

MOTIF® is registered trademark of, and a graphical user interface standard that refers to a publicly licensed toolkit that was developed by, Open Software Foundation, Inc. of 11 Cambridge Center, Cambridge, Mass. 02142, which is also known as The Open Group of 29 Montvale Avenue, Woburn, Mass. 01801. GIMP is an open source toolkit that is also referred to as GTK or GTK+ and is available from www.gtk.org. VTK is an X Window visualization toolkit that is available from Kitware at www.kitware.com.

A visualization and graphics toolkit common to X Window and third party toolkits is the X Window Intrinsics toolkit, which is also referred to as X Toolkit Intrinsics or Xt Intrinsics. This toolkit implements a set of user interface features or application environments that include object components, such as, menus, buttons, labels, scroll bars, scale-bars, drawing areas, and many other things. These object components are typically referred to as Widgets. There other types of Widgets that help manage things that are not necessarily graphical in nature, such as mouse and keyboard events. Using object-oriented techniques, an X Window based application manipulates Widgets provided by or made using the Xt Intrinsics toolkit or another higher level toolkit based on Xt Intrinsics, typically to do something on screen.

The Xt Intrinsics toolkit is also used by programmers to create new Widgets as well as new libraries or toolkits of Widgets. All of the aforementioned third party toolkits that exist and others are based on Xt Intrinsics and some of them are quite specialized. For example, there are toolkits used for processing on-screen graphics, producing 3-D graphics, animating objects, providing graphical analysis of data, and for many other applications.

Xt Intrinsics based visualization and graphics toolkits require an X event loop to provide behind the scenes support for communication between Widgets used by an application and an X Windows' X Server. JAVA does not directly provide any support for Xt Intrinsics and does not provide a method of supporting an X event loop. Past and present solutions to reusing Xt Intrinsics based visualization toolkits within a JAVA application or applet require that the application be separated into client and server processes and have some form of interprocess communication. The client process, called an X Client, provides the basic application structure written in JAVA. The server process, called the X Server, contains the X Windows Intrinsics graphics services, including any desired Widgets, that are made available through interprocess communication. Unfortunately, this solution requires additional development time and effort to provide the interprocess communication and the additional complexity needed to manage the client and server states.

As the following example demonstrates, an invalid state can occur because this limited solution provides no special concurrency control to properly synchronize the X event loop with the JAVA application. Assume that the desired goal of at least a portion of the JAVA application is to cause a 3-dimensional scene to be displayed that rotates continuously at varying rates. Also assume that the native Xt Intrinsics visualization code receives an expose event caused by revealing a window used to display a 3-dimensional scene. This expose event will cause the current 3-dimensional scene to be redrawn. Concurrent to this, the JAVA application requests a schedule camera position change as the 3-dimensional scene is rotated. This will cause a concurrent update of the camera transforms by the JAVA application while the camera transforms are also being read by the X event loop. Unfortunately, the transforms will likely be in an invalid state for the draw that was prompted by the expose event, which can produce an error that halts or otherwise adversely effects execution of the JAVA application. This simple example serves to show that some form of concurrency control is needed for a JAVA application to be able to use preexisting visualization toolkits and components created with such toolkits.

The goal of the present invention is to be able to reuse software components that have already been developed for one type of platform or software development system, namely Xt Intrinsics or Xt Intrinsics based toolkits along with Widgets constructed therefrom, in a JAVA application.

It would therefore be desirable to have a method that makes integrating at least one preexisting Xt Intrinsics based software component into a JAVA application practical and reliable. It would also be advantageous to be able to integrate at least one such preexisting software component into a JAVA application using a method that properly synchronizes the JAVA application and the component. It would also be advantageous to be able provide a method that properly synchronizes the JAVA application and the preexisting software component in a manner that prevents data corruption due to concurrency between the software component and that portion of the JAVA application that calls the software component. It would also be advantageous to be able to provide a method that synchronizes a JAVA application and a preexisting Xt Intrinsics based visualization toolkit. It would also be advantageous to be able to provide a method that synchronizes a JAVA application and a preexisting Xt Intrinsics based visualization toolkit in a manner that prevents data corruption due to concurrency between the X event loop that services the toolkit and a thread or the threads of the JAVA application that make calls to the toolkit.

SUMMARY OF THE INVENTION

The present invention provides a method of integrating preexisting software components, such as Widgets, that are included with and/or made using an X Windows Intrinsics or an X Windows Intrinsics based visualization toolkit, with a JAVA application.

In accordance with one aspect of the invention, a method of supporting concurrent X event processing and JAVA event processing is described. In this embodiment, a JAVA thread is devoted to executing an X event loop. An Xt Intrinsics file descriptor processing support function, XtAppAddInput, preferably is used as a means to suspend the X event loop to allow JAVA Native Interface (JNI) calls to be made from the JAVA application to the visualization toolkit. A method of acknowledgement is defined that assures that the toolkit's X event monitoring thread is safely suspended so that the JNI calls can be made without risk of data corruption due to concurrency between the X event processing thread and the JAVA application's calling thread and without concern for concurrent data updates to the toolkit data structures.

In accordance with another aspect of the invention, JAVA multithreading support services, such as JAVA's wait and notifyAll methods, are employed to allow safe conditions for multithreaded JAVA applications to also use the visualization toolkits, i.e., to assure serial execution of JNI calls to the visualization toolkit.

In accordance with another aspect of the invention, when JAVA's Abstract Window Toolkit (AWT) is implemented using Xt Intrinsics and with multiple application threads, the use of a separate Xt Intrinsics Application Context to service the X event loop is employed. Windows are managed in separate hierarchies associated with each application context. A specialized JAVA Canvas manages native windows transparent to the application programmer.

In accordance with still another aspect of the invention, a method for using an X Windows Intrinsics based visualization toolkit requiring an X event loop in a JAVA application is implemented that includes devoting a JAVA thread in the JAVA application to the X event loop; defining a write socket and a read acknowledge socket; calling the XtAppAddInput to register a process input function on the write socket, wherein the process input function performs a processInput and read, a write acknowledge, a read, and a return X event loop; defining a pausing method that performs a write on the write socket, and a read acknowledge on the read acknowledge socket; defining a resuming method that performs a write on the write socket; and when a call is made to the visualization toolkit, first calling the pausing method, making the call to the toolkit, and then calling the resuming method.

In accordance with a further aspect of the invention, a computer program is stored on computer readable storage media and includes a JAVA application thread that makes a call to a widget of an Xt Intrinsics based visualization toolkit and which has first and second write sockets; a JAVA process thread that creates an X event loop that has first and second read sockets and which can execute a blocking read that suspends further execution of the X event loop; wherein (1) a first data element is put on the first one of the write sockets by the JAVA application, (2) the first data element is read by the first one of the read sockets of the event loop, and (3) the blocking read is executed suspending further execution of the X event loop; wherein the call to the widget of the Xt Intrinsics based visualization toolkit is made; and wherein thereafter (1) a second data element is put on the second one of the write sockets by the JAVA application, (2) the second data element is read by the second one of the read sockets of the event loop, and (3) the blocking read is completed causing the event loop to resume execution.

In accordance with a still further aspect of the invention, the JAVA application thread of the computer program further comprises a read socket and can execute a blocking read that suspends further execution of the JAVA application thread; wherein the blocking read of the JAVA application thread is executed after the first data element is put on the first one of the write sockets of the JAVA application thread, which suspends further execution of the JAVA application; wherein the event loop further comprises a write socket; and wherein a third data element is put on the write socket of the event loop after the first data has been read by the first one of the read sockets and the data element is read by the read socket of the JAVA application thread, unblocking the blocking read of the JAVA application thread, and resuming execution of the JAVA application thread.

In accordance with another aspect of the invention, the computer program includes a call to the XtAppAddInput function to register an input function that handles the first data element read from the first one of the read sockets.

Various other features, advantages and objects of the present invention will be made apparent from the following detailed description and the drawings.

BRIEF DESCRIPTION OF THE DRAWINGS

The drawings illustrate the best mode presently contemplated for carrying out the invention.

In the drawings.

DETAILED DESCRIPTION OF AT LEAST ONE PREFERRED EMBODIMENT

Figure 1:
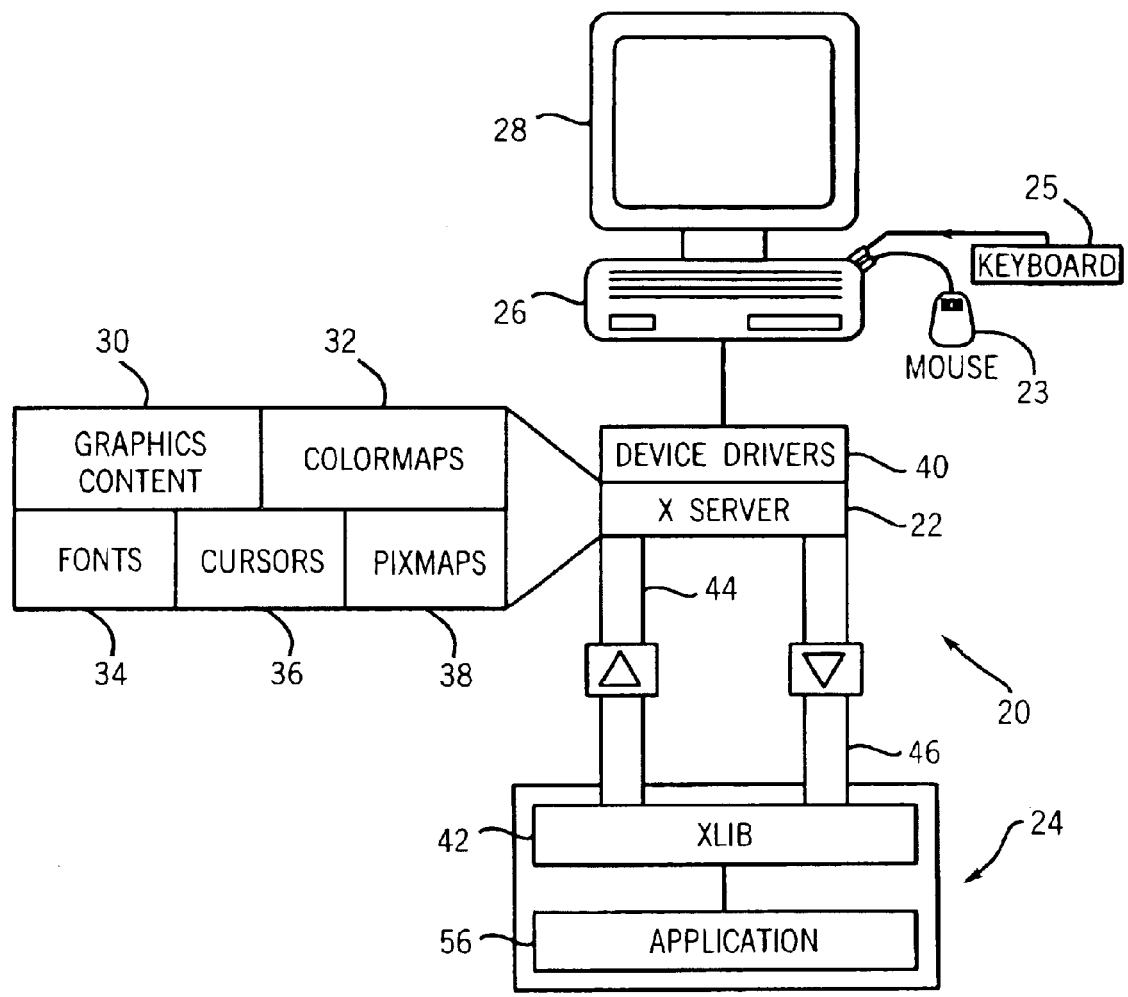
FIG. 1 is a schematic diagram that illustrates the typical hardware and software components of a computer running the X Window system.
Figure 2:
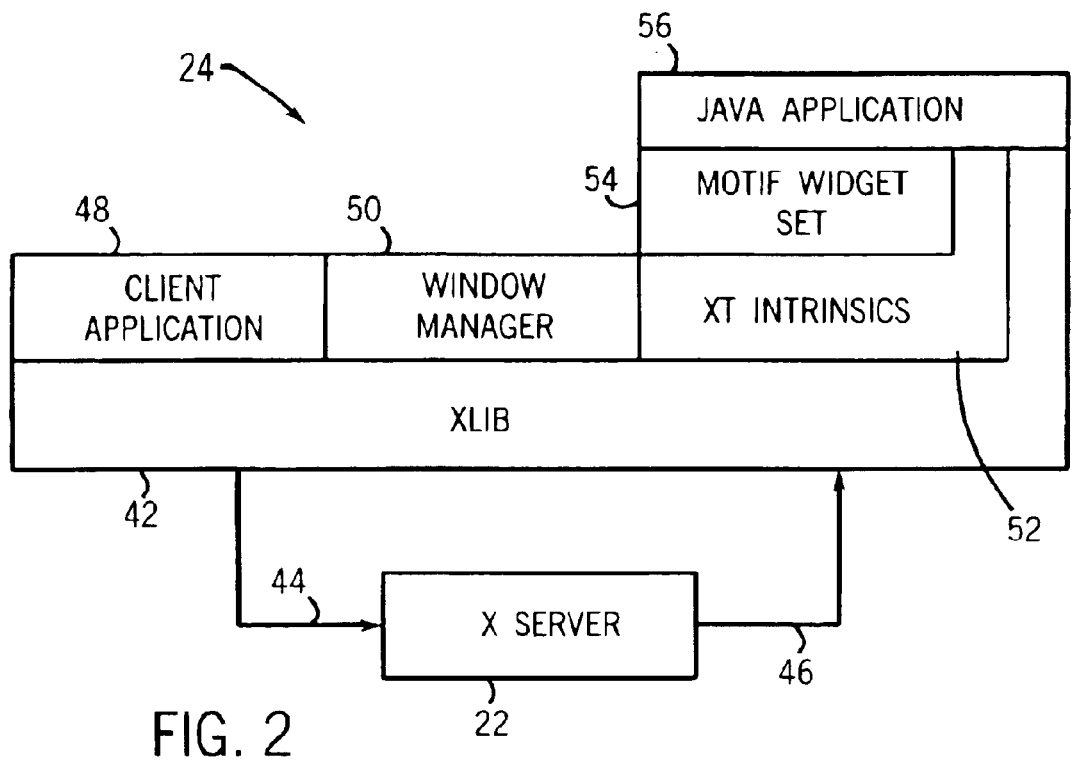
FIG. 2 is a block diagram illustrating the typical elements of the X Window system.

FIG. 1 illustrates an overview of an X Window system 20, which is a system that provides a way of writing device independent graphical and windowing software that can easily be ported from one computer to another computer. To date, it has primarily been implemented on computers and computer platforms running Unix or a Unix based operating system, such as Linux. FIG. 2 illustrates additional software components that make up the X Window system 20.

Referring to FIGS. 1 and 2, the X Window system 20 is made up of two primary components, an X Server 22 and an X Client 24. The X Server 22 is software that runs on a computer 26, such as a workstation, a PC, or the like, that is responsible for displaying windows and graphics on a display or a screen 28 of that particular computer. The X Server 22 has at its disposal, for example, graphics content 30, colormaps 32, fonts 34, cursors 36, and pixmaps 38 that are its building blocks. The X Server 22 interfaces with device drivers 40 to enable its output to be displayed on the monitor 28.

The X Client 24 includes software that can be run on the same computer 26 or a different computer, such as a network server or another workstation. The X Client sends messages to the X Server 22 when it needs to display graphics, text, windows, and other graphics related things as well as receive information about the occurrence of certain events, such as an event generated by a mouse 23 or a keyboard 25.

The computer 26 can also include storage media on which software can be stored. Examples of storage media include a hard drive, a removeable disk or cartridge in a drive or connector that accommodates that kind of storage media, a flash memory device, or another kind of storage media device. The storage media can be self-contained and disposed completely inside the computer 26, can be of removeable construction, and can be in a separate module that is linked to the computer 26, such as via a network or another means.

The X Client 24 includes X Lib 42, which is a low-level interface that provides communication paths, called connectors 44, 46, between it and the X Server 22. One connector 44 is used to communicate messages from X Lib 26 to the X Server 22 and the other connector 46 is used to communicate events, errors, and replies from the X Server 22 to the X Lib 26. The main task of the X Lib 26 is to translate data structures and procedures, usually written in C, into the messages that are communicated via connector 44 as well as to convert the messages received via connector 46 into C structures.

Referring to FIG. 2, the X Client 24 can also include a Client Application 48, a Window Manager 50, Xt Intrinsics 52, an Xt Intrinsics based toolkit, such as a MOTIF® Widget Set 54, and a JAVA Application 56. Not all of these are required. For example, in some instances a Client Application 48 is not required. In other instances, the MOTIF® toolkit 54 is not required. If desired, the X Client 24 can include more than one Client Application 48, more than one Window Manager 50, more than one Widget Set 54, or more than one JAVA Application 56.

Each Client Application 48 (sometimes also called "application client") is an X Windows specific software program that is specifically designed to run under the X Windows system. Examples of a few known X Clients include bitmap, gs, olwm, MATLAB®, gnuplot, resize, scale, apE, idl, idraw, xauth, xclock, xcolors, xcalc, xconsole, xdb, xdbx, xcalc, xdm, xdtm, xdpr, xgif, xhost, xman, xbiff, xgraph, xeyes, and xterm, to name a few. There are many, many other such client applications. MATLAB is a math software package that is commercially marketed by MathWorks, Inc., of Cochituate Place 24 Prime Park Way, Natick, Mass. 01760.

The Window Manager 50 is a client application that is granted special permission by the X Server 22 to have supervisory powers over window requests from other applications. Any top-level window operation that an application requests must be verified by the Window Manager 50 before the operation will take place. The Window Manager 50 is free to ignore any request that does not conform to the graphical user interface maintained by the particular Window Manager 50. The Window Manager 50 also provides window decorations that give a windowing system its distinctive look and feel. The Window Manager 50 provides a means for a user to control the position, size, relative depth, and other parameters of one or more windows on a screen. Examples of Windows Managers include twm, mwm, olwm, and DECWindows.

As already discussed above, Xt Intrinsics includes toolkit parts that allow programmers to build new Widgets as well as new libraries, sets, or toolkits of Widgets. The MOTIF® Widget Set 54 is an example of one such Widget set. There are many other widget sets, toolkits and libraries available. Examples of toolkits include Athena, VTK, OpenGL, and GIMP. VTK is an example of a preferred toolkit that is used for 2D and 3D graphics and visualization applications that have uses in medical and industrial fields.

VTK is an example of a preferred visualization toolkit because it forms the basis of many custom third party toolkits used for many graphics and visualization applications. For example, GE Medical System's visualization toolkit is called GVTK and is a toolkit that is based on VTK. Examples of graphics and visualization applications for which these toolkits are well suited include medical volume rendering and imaging, interactive engine visualization, financial data visualization, visualization of results of engineering analyses, reconstruction of anatomical structures of patients from CT, MRI and ultrasound scans, and virtual generation of printed matter, electronic manuals, and training materials. One machine on which a method encompassing the present invention can be implemented is a Sun Ultra workstation using a SunOS 5.5 or SunOS 5.6 operating system.

The JAVA Application 56 is shown in FIG. 2 as interfacing with X Lib 42, Xt Intrinsics 52, and a MOTIF® Widget Set 54. If desired, the JAVA Application 56 can interface with toolkits other than MOTIF®. For example, the JAVA Application 56 can interface with the VTK toolkit in addition to or in lieu of MOTIFS. The JAVA Application 56 can also interface with toolkits that are based on the VTK toolkit and which are used for graphics and visualization applications, such as one or more of those described above.

Figure 3:
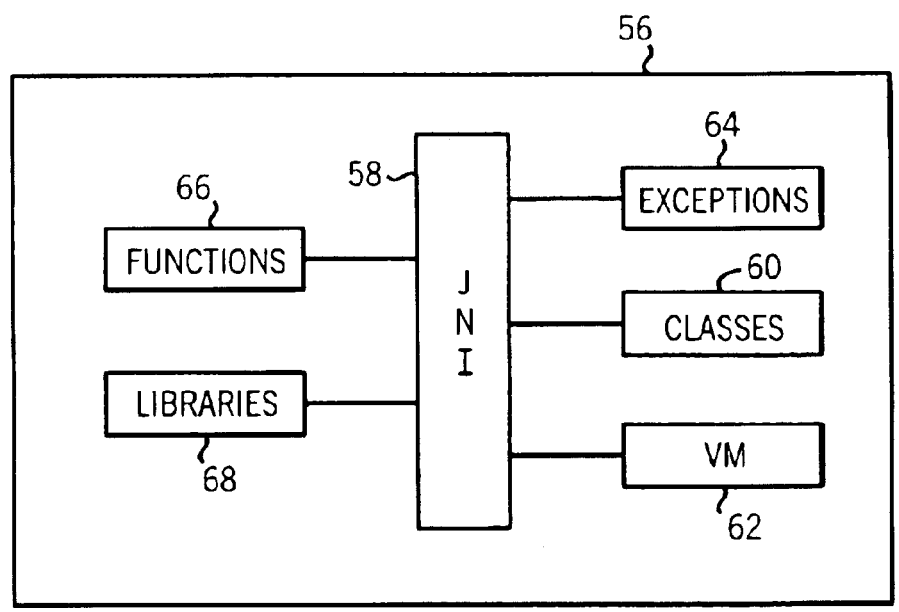
FIG. 3 is a schematic diagram of one preferred general arrangement used in JAVA for integrating native or preexisting code with a JAVA application.

FIG. 3 is a diagram that generally illustrates how a JAVA Application 56 can use already existing native applications and native libraries, e.g. toolkits, written in other languages, including the C or C++ language of Xt Intrinsics. For example, the JAVA Native Interface (JNI) 58 interfaces with JAVA classes 60, a JAVA virtual machine (VM) 62, and exceptions 64, if any are to be taken into account. The JNI 58 also interfaces with one or more native functions 66 and one or more native libraries 68. The JNI 58 can also be used to interface native routines, native classes, native debuggers, and native typecheckers with a JAVA application.

Figure 4:
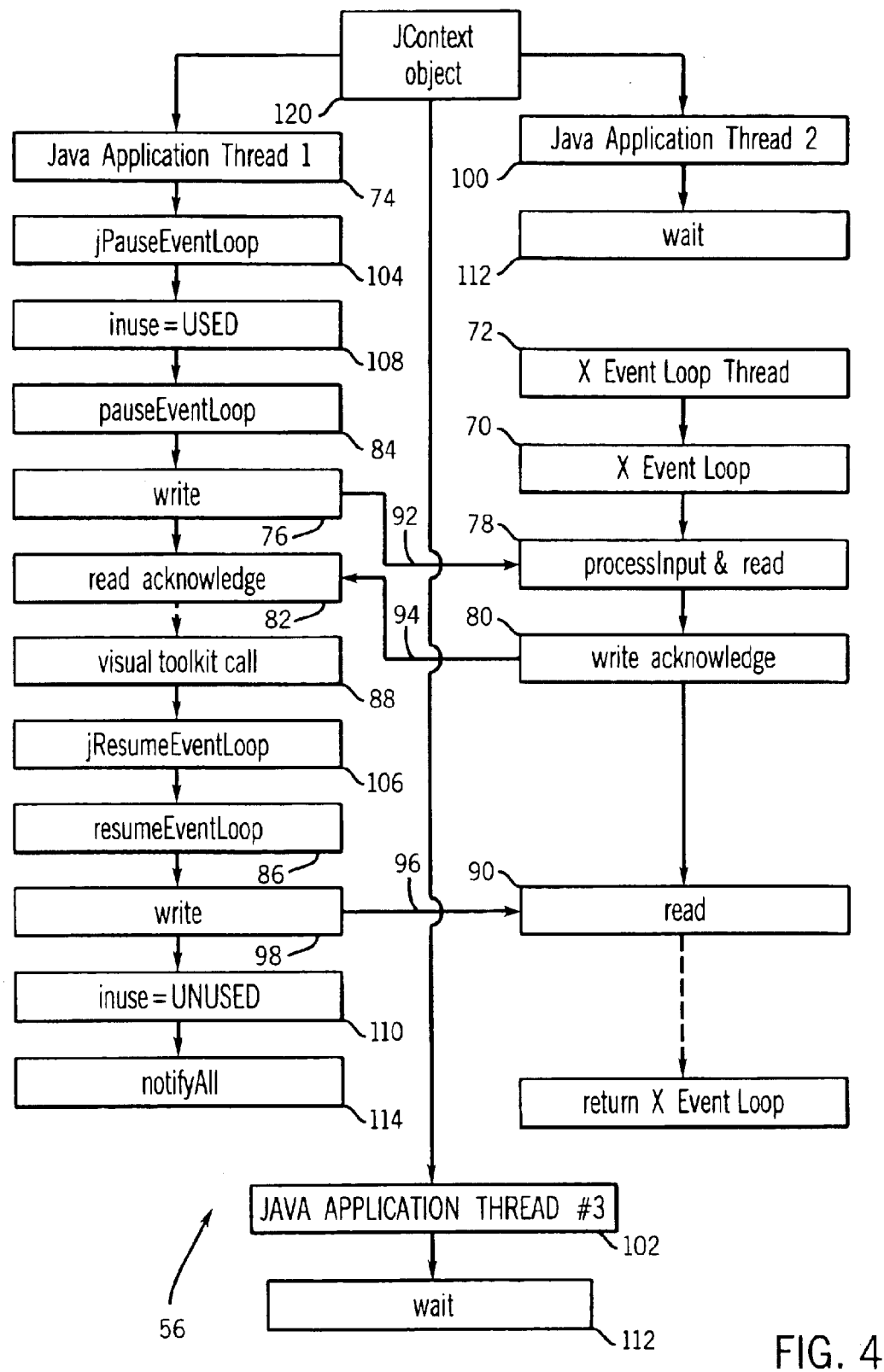
FIG. 4 is a flowchart diagram depicting a preferred method of integrating an Xt Intrinsics based toolkit into a JAVA application.

FIG. 4 illustrates a preferred method for using Xt Intrinsics or an Xt Intrinsics based toolkit with a JAVA application 56. Although JAVA does not provide direct support for Xt Intrinsics, the X Event Loop 70 required to support communication between Xt Intrinsic based Widgets and the X Server preferably is implemented in C and called via the JAVA application 56 by a process thread called X Event Loop Thread 72 that is created using the JAVA Thread class. The JAVA application 56 also includes at that is created using the JAVA Thread class. The JAVA application 56 also includes at least one JAVA application thread, such as JAVA Application Thread #1 74, that contains application code and which communicates with the X Event Loop 70 to provide concurrency control. Where the application 56 has more than one application thread, each application thread that makes calls to visualization toolkits, individual Widgets, and the like is also configured to provide concurrency control.

The X Event Loop 70 provides event monitoring for the Xt Intrinsics based toolkit that will be accessed by it and the application thread 74. The X Event Loop 70 has some special supporting resources. First, a pair of sockets 76, 78 are created with one of the sockets being a write socket, referred to in FIG. 4 as write 76, in the application thread 74 and the other one of the sockets being a read socket, referred to in FIG. 4 as read 78, in the X Event Loop 70. Both of these sockets 76, 78 are connected or linked in such a way that they are essentially piped together so that output of the write socket 76 is automatically directed to the read socket 78.

Second, a callback function, identified as processInput 78, is registered with Xt Intrinsics to process data delivered to the read socket 76. The processInput callback function relies on the standard Xt Intrinsics XtAppAddInput function to control thread execution of the X Event Loop. XtAppAddInput is a file descriptor that is used to register a new source of events with Xt Intrinsics. In the present method, the XtAppAddInput is used to register the processInput function 78 preferably on the write socket 80.

Third, another pair of sockets, called write acknowledge 80 and read acknowledge 82, are created. Fourth, an application context (not depicted in FIG. 4) is created for the X Event Loop 70. Once these resources are created, the X Event Loop Thread 72 is created in JAVA. This thread 72 calls a special native code function, typically written in C, that serves as the X Event Loop 70. This thread 72 remains in execution the entire time that the JAVA application is running.

Two special functions, pauseEventLoop 84 and resumeEventLoop 86, are implemented in the application thread 74 to provide concurrency control by preventing concurrency conditions from arising so that both the JAVA application 56 and the Xt Intrinsics 52 (and toolkit 54) run smoothly without interfering with each other and with locations and objects, such as Widgets, to which they both might attempt to send data or access. These two functions 84, 86 accomplish this by holding the X Event Loop Thread 72 in a safe location while the JAVA application thread 74 makes a visualization toolkit call 88 to Xt Intrinsics 52 or an Xt Intrinsics based toolkit 54. Preferably, these functions do so by selectively suspending execution of the X Event Loop 70 while the visualization toolkit call 88 is made and then resuming execution of the X Event Loop 70 after the call has been made.

During operation of the application thread 74 and while the X Event Loop 70 is running concurrently, the pauseEventLoop 84 function writes a first data element 92 to the write socket 76. The data element 92 can be a token data element, such as a simple byte or a token. The pauseEventLoop 84 then performs a blocking read on the read acknowledge socket 82, which pauses execution of the application thread 74 until a second data element 94 is subsequently received by the read acknowledge socket 82. The X Event Loop Thread 72 and, hence, the X Event Loop 70, continue execution until the first data element 92 is discovered on the write socket 76. For example, depending at what point the X Event Loop is at in its execution, the X Event Loop 70 can completely finish processing its current X event and then return to check for a data element on its read socket 78.

When the first data element 92 is discovered on the write socket 76, the X Event Loop 70 invokes the processInput function 78, reads the data element 92 from the write socket 76, writes a second data element 94 to the write acknowledge socket 80, and performs a blocking read on a second read socket 90 of the loop 70. The data element 94 written to the write acknowledge socket 80 is directed to the read acknowledge socket 82 of the pauseEventLoop 84 of the application thread 74 causing the read acknowledge block to unblock. When unblocked, execution of the application thread 74 resumes and control preferably is transferred to the thread 74.

At the same time or about the same time that control is returned to the application thread 74, the blocking read performed on the second read socket of the X Event Loop 70 causes the loop 70 to pause execution. This pause in execution of the X Event Loop 70 permits a visual toolkit call 88 to be made to a graphics/visualization object that can be a toolkit 52 or 54 or a Widget. Although not depicted in FIG. 4, this call 88 is made using the JAVA Native Interface 58. As a result of suspending execution of the X Event Loop 70, the call 88 can safely be made with any fear of concurrency related data corruption. Selectively suspending execution of the X Event Loop 70 to permit a visualization toolkit call 88 to be made provides concurrency control that advantageously prevents concurrency related data corruption.

Once the visualization toolkit call 88 is made, the application thread calls the resumeEventLoop function 86. Calling this function 86 writes a third data element 96 to a second write socket 98 of the application thread 74 and continues execution of the thread 74. When the third data element 96 is discovered on the second read socket 90 of processInput 78 of the X Event Loop 70, it unblocks the second read 90 and causes the X Event Loop 70 to resume execution.

Where the JAVA application has multiple threads, such as JAVA Application Thread #1, identified in FIG. 4 by reference numeral 74, JAVA Application Thread #2, identified by reference numeral 100, and JAVA Application Thread #3, identified by reference numeral 102, additional concurrency control is needed so that only one application thread at a time can make a visualization toolkit call 88. To provide this control, a multithreaded application has a special JAVA class, called JContext class, that contains two JAVA methods, jPauseEventLoop 104 and jResumeEventLoop 106, that mirror the pauseEventLoop and resumeEventLoop functions. These methods 104, 106 prevent more than one application thread from invoking pauseEventLoop 84 and making a visual toolkit call 88 through the use of a member variable of this class that each application thread has that is called inuse. One JContext object 120 is created in the JAVA application that includes inuse, jPauseEventLoop 104, and jResumeEventLoop 106 to synchronize the threads 74, 100 and 102 and control access to the visualization toolkit(s), Widgets, etc. by all threads 74, 100, and 102 of the application.

The member variable inuse keeps track of the condition of when a pauseEventLoop 84 has been called but a matching variable resumeEventLoop 86 in the same application thread has not been called. The member variable inuse indicates this very condition when it is set to USED 108. When inuse is set to UNUSED 110, a new pauseEventLoop 84 can be called.

One of the JAVA methods, jPauseEventLoop 104, is a mirror of pauseEventLoop 84. This method 104 waits until inuse is set to UNUSED 110. If inuse is set to UNUSED at the time when thread execution reaches jPauseEventLoop 104, jPauseEventLoop 104 sets it to USED 10 and calls pauseEventLoop 84. However, if inuse is already set to USED when thread execution reaches jPauseEventLoop 104, pauseEventLoop 84 will call the standard JAVA Object wait( ) method 112 and execution of that application thread will be suspended until another application thread calls the standard JAVA Object method notifyAll 114. This method 114 is present in each application thread that makes a visualization toolkit call.

The mirror of resumeEventLoop 86, called jResumeEventLoop 106, calls resumeEventLoop 86. Once control returns from resumeEventLoop 86, inuse is set to UNUSED 110 and the notifyAll 114 is invoked. This triggers pending jPauseEventLoop calls to each of the threads to check their inuse variable. Ultimately, this check of inuse of each thread will permit jPauseEventLoop 104 of one of the application threads to gain access to pauseEventLoop 84 of that thread and cause jPauseEventLoop 104 of every other application thread to execute a call to wait 112 that suspends their execution.

Access to inuse is controlled through JAVA's synchronized method support used by jPauseEventLoop 104 and jResumeEventLoop 106. Rather than the application thread invoking pauseEventLoop 84 and resumeEventLoop 86, the application thread invokes jPauseEventLoop 104 and jResumeEventLoop 106, which serve to thereby assure the sequential execution of pauseEventLoop 84, the JNI visualization toolkit call 88, and resumeEventLoop 86 across multiple application threads.

In at least one preferred implementation of the method of this invention, the method requires two separate application contexts, with each one associated with one or more X windows. For example, the JAVA Abstract Window Toolkit (AWT) application context will typically be associated with one or more top level windows into which native drawing is done, such as through calls made to visualization toolkits, Widgets, and other threads 74, 100, 102, which owns a native top-level window. The native top level window has no decoration and is, in effect, "pasted" onto the resultant canvas so that any expose, size, move, minimize, maximize, raise, lower, and/or other operation on the canvas also causes analogous operations on the native window. This allows JAVA programmers to simply work with canvas objects as they normally would and not have to worry about these other details. It should be noted that the native window and the canvas belong to completely separate window hierarchies, each associated with their respective application contexts. For example, the Swing implementation provides a NativeJPanel, which is analogous to the NativeCanvas class.

In operation of a JAVA application having multiple threads, such as the application 56 depicted in FIG. 4, only one thread 74 gains access to change the value of inuse to USED 108 from jPauseEventLoop 104. The remaining threads 100, 102 are suspended by a JAVA wait call 112. The surviving thread calls pauseEventLoop 84 and pauseEventLoop 84 performs a write on the write socket 76 to cause the processInput function 78 to be invoked by the X Event Loop 70. The processInput function 78 reads off the data element or token 92 from the read socket 78, writes a token 94 back on its write acknowledgment socket 80, and starts a blocking read in its read socket 90, which causes the X Event Loop 70 to suspend until resumeEventLoop 86 of the application thread 74 writes to its write socket 98.

After or concurrent with the suspension of the X Event Loop 70 on the blocking read 90, a call is made from the application thread 74 using JNI to the visualization toolkit 88. The JAVA method jResumeEventLoop 106 is then invoked to allow the X Event Loop 70 and the X Event Loop Thread 72 to resume execution. When invoked, jResumeEventLoop 106 writes a token 96 on its write socket 98 that satisfies the read 90, Event Loop 70 and the X Event Loop Thread 72 to resume execution. When invoked, jResumeEventLoop 106 writes a token 96 on its write socket 98 that satisfies the read 90, which causes it to unblock and resume execution of the X Event Loop 72. After that, jResumeEventLoop 106 sets inuse to UNUSED 110, which can allow one of the JAVA application threads currently suspended on a wait call 112 to gain access to jPauseEventLoop 84 to perform another sequence of calls that can include other visualization toolkit calls. Thereafter, jResumeEventLoop 106 calls notifyAll 114 to awaken the threads 100, 102 that were previously suspended by a wait call 112.

The steps of the above-described method are preferably repeated at least once. Preferably, they are repeated as necessary until execution of the application stops or is stopped, such as by a user exiting the application.

The present invention has been described in terms of the preferred embodiment, and it is recognized that equivalents, alternatives, and modifications, aside from those expressly stated, are possible and within the scope of the appending claims.

What is claimed is:

1. A method of integrating an X Window visualization toolkit with a JAVA application comprising:

providing a JAVA application thread that includes a call to an X Window visualization toolkit and a JAVA process thread that comprises an X Window event loop;

suspending execution of the X event loop to prevent concurrency related data corruption while a call to the X Window visualization toolkit is made by the JAVA application thread; and wherein the application thread comprises a first write socket that is used to communicate a first data element to a first read socket of an XtAppAddInput file descriptor function of the X event loop, a read acknowledge socket of the application thread that acknowledges receipt of a second data element from a write acknowledge socket of the XtAppAddInput file descriptor function of the X event loop, and a second write socket that is used to communicate a third data element to a second read socket of the X event loop; and further comprising the steps of;

communicating a first data element from the first write socket of the JAVA application thread to the first read socket of the X event loop;

performing an application thread blocking read that suspends execution of the application thread until a second data element is discovered by the read acknowledge socket of the application thread;

communicating the second data element from the write acknowledge socket of the X event loop to the read acknowledge socket of the application thread;

resuming execution of the application thread when the second data element is discovered by the read acknowledge socket of the application thread;

performing the X event loop blocking read that suspends execution of the X event loop until a third data element is discovered by the second read socket of the X event loop;

making a call from the JAVA application thread to the visualization toolkit while execution of the X event loop is suspended;

communicating the third data element from the second write socket of the application to the second read socket of the X event loop; and resuming execution of the X event loop when the third data element is discovered by the second read socket of the X event loop.

2. The method of claim 1 wherein the X event loop comprises an X Window file descriptor function that coordinates an X event loop blocking read that is used to suspend execution of the X event loop.

3. The method of claim 1 wherein the application thread further comprises a plurality of JAVA functions with a first one of the functions pausing execution of the X event loop by causing the first data element to be communicated to the first read socket of the X event loop and a second one of the functions resuming execution of the X event loop by causing the third data element to be communicated to the second read socket of the X event loop.

4. The method of claim 3 wherein the JAVA application comprises a plurality of application threads and a class defining a pair of JAVA methods having a first one of the JAVA methods that mirrors the first one of the functions that pauses execution of the X event loop for each application thread and a second one of the JAVA methods mirroring the second one of the functions that resumes execution of the X event loop for each application thread wherein the first and second JAVA methods present more than one application thread at a time from making a call to the visualization toolkit or widget.

5. The method of claim 4 wherein each one of the application threads comprises a member variable of the class that is used in determining which one of the application threads can make a call to the visualization toolkit or widget.

6. The method of claim 4 wherein each one of the application threads comprises a member variable of the class that is used to determine which one of the application threads executes thereby causing all of the remaining application threads to suspend execution.

7. The method of claim 4 wherein each one of the application threads comprises a member variable of the class that is used in restricting making a call to the visualization toolkit or widget to only one application thread at a time.

8. The method of claim 5 wherein the member variable can be set to (a) one of a pair of values with a first one of the values indicating that (i) one of the plurality of JAVA functions of one of the application threads has been called and (ii) the other one of the plurality of JAVA functions of the one of the application threads has not yet been called and (b) a second one of the values indicating that both of the JAVA functions of the one of the application threads have been called.

9. The method of claim 8 wherein the first one of the JAVA methods checks the member variable and issues a wait call suspending operation of the one of the application threads if the member variable has the first one of the values and permits execution of the one of the application threads to continue if the member variable has the second one of the values.

10. The method of claim 8 wherein the wait call comprises call to the standard JAVA Object wait method.

11. The method of claim 9 wherein the member variable is set to the second one of the values before completing execution of the one of the application threads.

12. The method of claim 11 wherein a call is made to the standard JAVA Object notifyAll upon completion of the one of the application threads.

13. The method of claim 11 wherein making a call to notifyAll upon completion of the one of the application threads invokes the first one of the JAVA methods to determine which one of the plurality of application threads should be executed.

14. The method of claim 1 wherein the toolkit comprises at least one widget.

15. The method of claim 14 wherein the at least one widget comprises a visualization/graphics object.

16. The method of claim 1 wherein the JAVA application comprises a JAVA applet.

17. A method of using an X Window visualization toolkit or widget in a JAVA application or applet comprising:

(a) providing a plurality of JAVA application threads that each include a call to an X Window visualization toolkit or widget and a JAVA process thread that comprises an X Window X event loop;

(b) selecting one of the plurality of application threads to execute and then suspending execution of the remainder of the plurality of application threads;

(c) suspending execution of the X event loop while a call to the X Window visualization toolkit or widget is made by the one of the plurality of application threads;

(d) making a call to the X Window visualization toolkit or widget;

(e) resuming execution of the X event loop; and wherein suspending execution of the X event loop in step (c) comprises;

(1) providing a pause function of the one of the plurality of the application threads that communicates a first data element to a first write socket that is linked to a first read socket of the X event loop and a process data element function of the X event loop that reads the first data element from the read socket and issues a blocking read;

(2) communicating the first data element to the first write socket of the one of the plurality of the application threads;

(3) retrieving the first data element by the first read socket of the X event loop; and (4) invoking a blocking read suspending execution of the X event loop.

18. The method of claim 17 comprising repeating steps (b) through (e) at least once.

19. The method of claim 17 wherein the widget comprises a visualization/graphics object.

20. The method of claim 19 wherein the X event loop comprises an X Window file descriptor function that performs the blocking read.

21. The method of claim 20 wherein the X Window file descriptor function comprises the XtAppAddInput function.

22. The method of claim 17 wherein after step (b), an additional step comprising suspending execution of the one of the plurality of the application threads to allow the X event loop to finish processing any X event being processed by the X event loop before execution of the X event loop is suspended in step (c).

23. The method of claim 22 wherein suspending execution of the one of the plurality of the application threads is accomplished by a blocking read that includes a read socket of the one of the plurality of application threads that receives a data element from a write socket of the X event loop.

24. The method of claim 17 wherein resuming execution of the X event loop in step (e) comprises:
(1) providing a resume function of the one of the plurality of the application threads that communicates a second data element to a second write socket that is linked to a second read socket of the X event loop;
(2) communicating the second data element to the second write socket (98) of the one of the plurality of the application threads;
(3) retrieving the second data element by the second read socket of the X event loop; and
(4) unblocking the blocking read resuming execution of the X event loop.

25. The method of claim 17 wherein the call to the X Window visualization toolkit or widget comprises a call to an X Window Intrinsics based toolkit or widget.

26. The method of claim 25 wherein the X Window Intrinsics based toolkit comprises VTK or a toolkit based on VTK.

27. The method of claim 17 wherein the call to the X Window visualization toolkit or widget is made using the JAVA Native Interface.

28. A method of using an X Window visualization toolkit or widget in a JAVA application or applet comprising:
(a) providing a plurality of JAVA application threads that each include a call to an X Window visualization toolkit or widget and a JAVA process thread that comprises an X Window X event loop;
(b) selecting one of the plurality of application threads to execute and then suspending execution of the remainder of the plurality of application threads;
(c) suspending execution of the X event loop while a call to the X Window visualization toolkit or widget is made by the one of the plurality of application threads;
(d) making a call to the X Window visualization toolkit or widget;
(e) resuming execution of the X event loop; and
wherein suspending execution of the X event loop in step (c) comprises:
(1) providing a pause function of the one of the plurality of the application threads that communicates a first data element to a first write socket that is linked to a first read socket of the X event loop, and a process data input function of the X event loop that reads the first data element from the read socket and communicates a second data element to write acknowledgement socket that is linked to a read acknowledge socket of the one of the plurality of the application threads;
(2) communicating the first data element to the first write socket of the one of the plurality of the application threads;
(3) invoking a first blocking read suspending execution of the one of the plurality of the application threads;
(4) retrieving the first data element by the first read socket of the X event loop;
(5) communicating the second data element to the write acknowledge socket of the X event loop;
(6) retrieving the second data element by the read acknowledgement socket of the one of the plurality of the application threads;
(7) invoking a second blocking read suspending execution of the X event loop; and
(8) unblocking the first blocking read resuming execution of the one of the plurality of the application threads.

29. The method of claim 28 wherein steps (2) through (7) are performed in the order recited.

30. The method of claim 28 wherein the process data input function comprises the XtAppAddInput function native to the X Window system.

31. The method of claim 28 wherein the process thread calls a native code function that serves as the X event loop.

32. A method for using an X Windows Intrinsics based visualization toolkit requiring an X event loop in a JAVA application, comprising:
devoting a JAVA thread in the JAVA application to the X event loop;
defining a write socket and a read acknowledge socket;
calling XtAppAddInput to register a process input function on the write socket, wherein the process input function performs a processInput and read, a write acknowledgement, a read, and a return X event loop;
defining a pausing method that performs a write on the write socket, and a read acknowledgement on the read acknowledgement socket;
defining a resuming method that performs a write on the write socket; and
when a call is made to the visualization toolkit, first calling the pausing method, making the call to the toolkit, and then calling the resuming method.

33. A computer program stored on computer readable storage medium of a computer comprising:
(a) a JAVA application thread that makes a call to a widget of an Xt Intrinsics (52) based visualization toolkit and which has first and second write sockets;
(b) a JAVA process thread that creates X event loop that has first and second read sockets and which can execute a blocking read that suspends further execution of the X event loop;
(c) wherein (1) a first data element is put on the first one of the write sockets by the JAVA application the first data element is read by the first one of the read sockets of the event loop, and the blocking read is executed suspending further execution of the X event loop;
(d) wherein the call to the widget (88) of the Xt Intrinsics based visualization toolkit is made; and
(e) wherein thereafter (1) a second data element is put on the second one of the sockets by the JAVA application, (2) the second data element is read by the second one of the read sockets of the event loop, and the blocking read is unblocked causing the event loop to resume execution.

34. The computer program of claim 33 wherein:
(a) the JAVA application thread further comprises a read socket and can execute a blocking read that suspends further execution of the JAVA application thread;
(b) the blocking read of the JAVA application thread is executed after the first data element is put on the first one of the write sockets by the JAVA application thread, which suspends further execution of the JAVA application;
(c) the event loop further comprises a write socket; and
(d) a third data element is put on the write socket of the event loop after the first data has been read by the first one of the read sockets and the data element is read by the read socket of the JAVA application thread, unblocking the blocking read of the JAVA application thread, and resuming execution of the JAVA application thread.

35. The computer program of claim 33 wherein the XtAppAddInput function is called to register an input function that handles the first data element read from the first one of the read sockets.

* * * * *

UNITED STATES PATENT AND TRADEMARK OFFICE
CERTIFICATE OF CORRECTION

PATENT NO.    : 6,918,125 B1
DATED         : July 12, 2005
INVENTOR(S)   : Skinner, Jr. et al.

It is certified that error appears in the above-identified patent and that said Letters Patent is hereby corrected as shown below:

<u>Title page,</u>
Item [75], Inventors, should read -- John V. Skinner JR. --.

<u>Column 10,</u>
Line 42, insert -- X -- before "event loop"; and
Line 57, change ";" to -- : --.

<u>Column 11,</u>
Line 36, change "present" to -- prevent --.

<u>Column 14,</u>
Line 41, insert -- write -- before "sockets".

Signed and Sealed this

Thirteenth Day of September, 2005

JON W. DUDAS
*Director of the United States Patent and Trademark Office*